(No Model.)
N. A. MILLER.
INDICATOR.
No. 487,445. Patented Dec. 6, 1892.
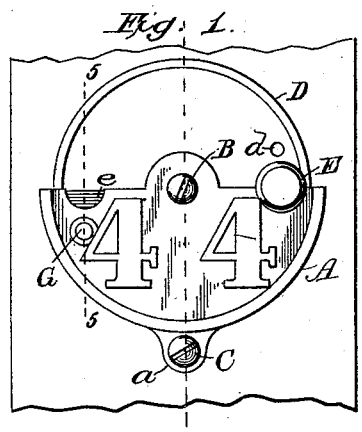
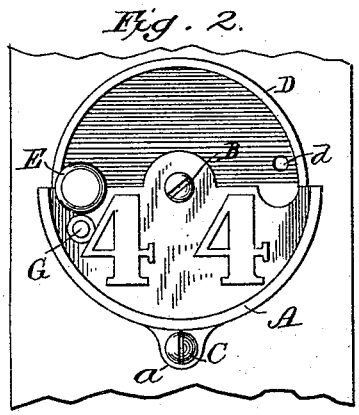
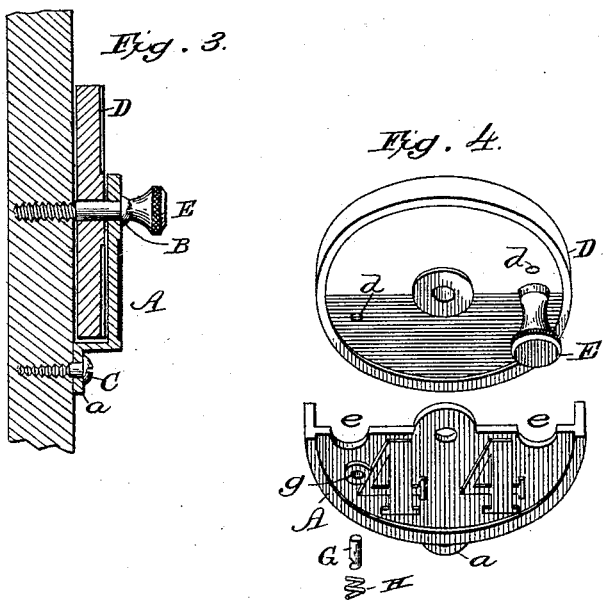
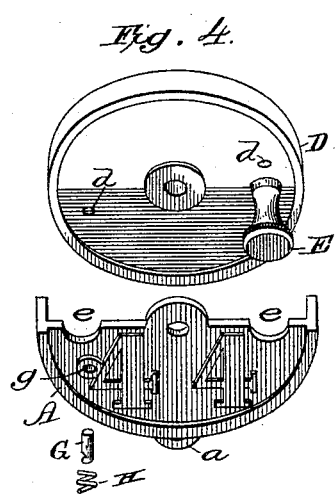
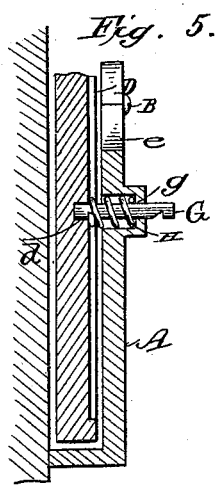
Witnesses
A. J. Schwartz
Richard H. Taylor
Inventor
Nelson A. Miller
By his Attorney,
J. Fred. Reily.

UNITED STATES PATENT OFFICE.

NELSON A. MILLER, OF ELMIRA, NEW YORK.

INDICATOR.

SPECIFICATION forming part of Letters Patent No. 487,445, dated December 6, 1892.

Application filed January 23, 1892. Serial No. 419,044. (No model.)

*To all whom it may concern:*

Be it known that I, NELSON A. MILLER, a citizen of the United States, residing at Elmira, in the county of Chemung and State of New York, have invented certain new and useful Improvements in Indicators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention consists in a new and improved indicator which will greatly facilitate and simplify the work of ushers in churches, theaters, &c., and is also adapted to be used in a great variety of other positions and places; and this invention will be hereinafter fully described and claimed.

Referring to the accompanying drawings, Figure 1 is a plan view of my indicator. Fig. 2 is a similar view showing the disk turned over for a half-revolution. Fig. 3 is a central vertical sectional view. Fig. 4 illustrates the two parts of the device separated and in detail; and Fig. 5 is a sectional view taken on line 5 5, Fig. 1.

The same letters of reference indicate corresponding parts in all the figures.

By referring to the drawings it will be seen that my indicator is composed or formed of two parts or pieces A and D. The part A is a semicircular body or casing formed with an inwardly-extending flange along its curved edge, which when the casing A is secured in position against a door or similar object holds the flat body of the casing out, leaving a suitable space between it and the face of the door. Within this casing fits the lower half of a disk D, which is held in position and revolves on a central pivot-screw B, which passes through the center of the casing and of the disk into the door, and the casing A is held in place by this pivot-screw and by a screw C, which passes through a lug $a$, which projects from the lower edge of the casing, as shown. The disk is provided with a knob E for convenience in manipulating it, and the upper straight edge of the casing A is recessed at the points $e$ on each side, these recesses receiving the rounded stem of the operating-knob when the disk is turned over to either side to permit the full half of the disk to be inclosed within the casing. One half of the disk is preferably painted white and is exposed to view when the knob E is turned over to the right, as shown in Fig. 1, while the other half of the disk is painted black (or any other desired color) and is exposed when the knob is turned over to the left, as shown in Fig. 2. It will be seen that by this alternation of colors or by marking the two halves of the disk with designs, figures, characters, or letters the usher will be enabled to see at a glance whether any seat or row on which the indicator is placed is "free," "sold," "rented," "reserved," "occupied," &c., according to the system under which the indicators are being used—that is to say, in a theater they would generally be used to indicate whether seats were reserved or not or whether they were engaged duing a performance while the owner was temporarily absent. The casing A may be utilized to take the place of the usual numbers on pews, seats, &c., or for showing tiers of seats, rows of chairs, &c., by placing the desired number or designation on the outer face of the casing, as shown in the drawings. The part A also serves to cover a portion of the disk D, allowing the other half only to be seen.

In order to hold the disk D over in the position into which it has been turned, I may employ a spring-catch, as shown, consisting of the locking-pin G, which is normally pressed in by the small spiral spring H, the pin working through a small aperture $g$ in the fixed casing, so that its inner end engages with an aperture $d$ in the disk, thus holding the disk locked in the position to which it has been turned. The disk is formed with the two small apertures $d$, so that when turned to either side it will be engaged by the spring-catch. The entire spring-catch may of course be dispensed with when preferred.

From the foregoing description, taken in connection with the accompanying drawings, the construction, operation, and advantages of my invention will be readily understood.

It will be seen that my new and improved indicator is extremely simple in construction and can therefore be manufactured and placed on the market at a small cost, as it is composed of only two pieces, the semicircular casing A and the disk D, as the spring-catch can be dispensed with when desired for the sake of economy.

I do not confine myself to the exact form of the casing A and movable part D, nor to the exact construction of spring-catch employed.

Having thus described my invention, what I claim, and desire to secure by Letters Patent, is—

1. The indicator for pew-doors, chair-backs, &c., consisting of the flat semicircular plate A, formed with the integral inwardly-extending edge flange to adapt it to be secured against a flat surface and leave an open space behind the plate, the disk D, fitting on the inner side of said plate, and the pivot-screw B, passing through the plate and the disk, forming a retaining device for the plate and a pivot for the disk, substantially as set forth.

2. The herein-described indicator for pew-doors, chair-backs, &c., consisting of the flat semicircular plate A, formed with the inwardly-extending integral edge flange and the aperture $g$, the straight pin G, working through said aperture, the spiral spring H, arranged upon the pin, as shown, the disk D, fitting on the inner side of the plate A and formed with the opposite transverse appertures $d\,d$, with which the pin G engages, and the central pivot-screw B, substantially as and for the purposes set forth.

In testimony whereof I affix my signature in presence of two witnesses.

NELSON A. MILLER.

Witnesses:
SHERMAN C. ESTEY,
ELDAAH H. LANDON.